Nov. 28, 1961 R. G. HOLLINGER 3,010,587
WORKPIECE TRANSFER MECHANISM
Filed Sept. 20, 1957 9 Sheets-Sheet 1

INVENTOR.
RICHARD G. HOLLINGER
BY
Donnelly, Mentag & Harrington
ATTORNEYS

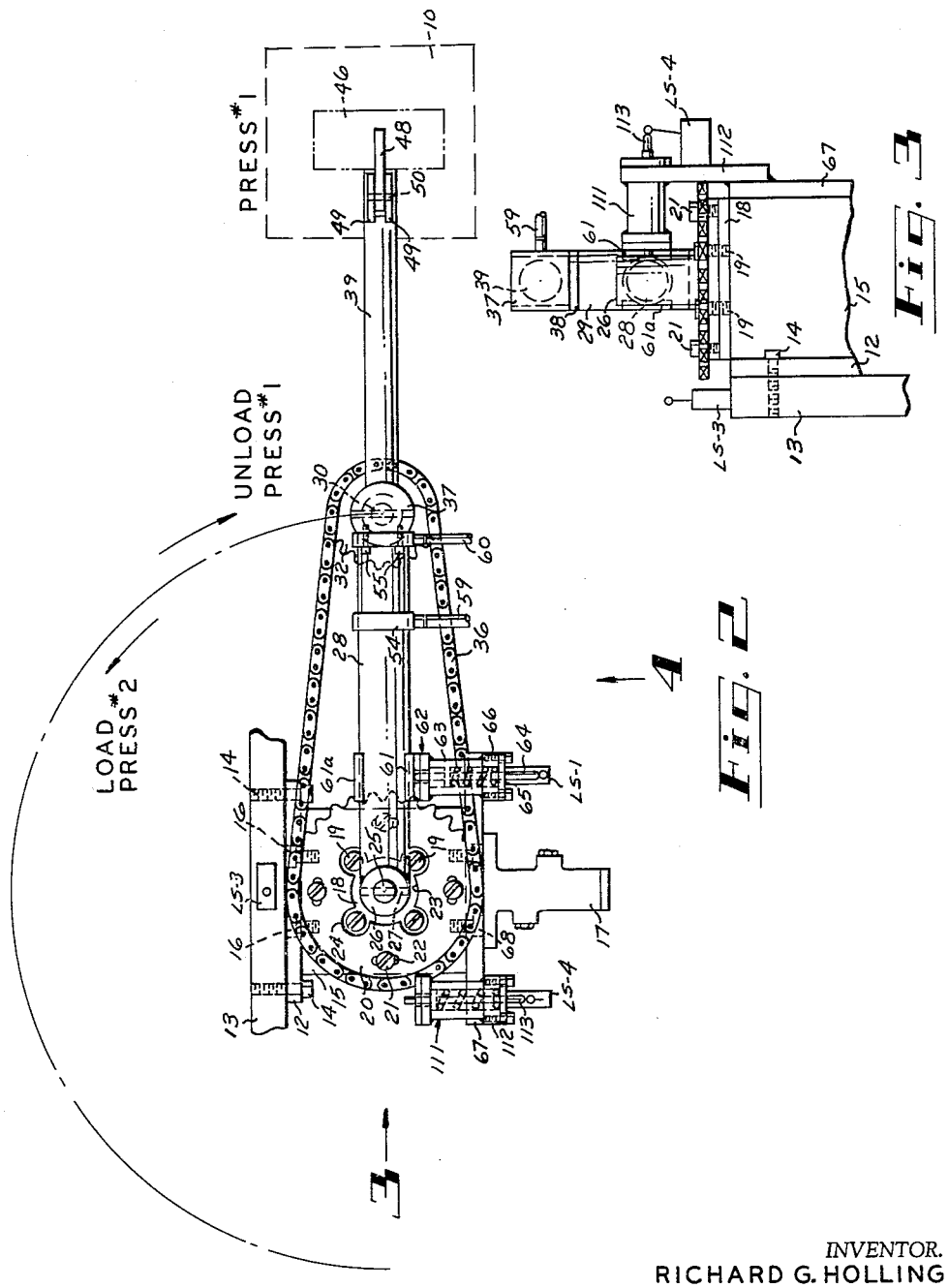

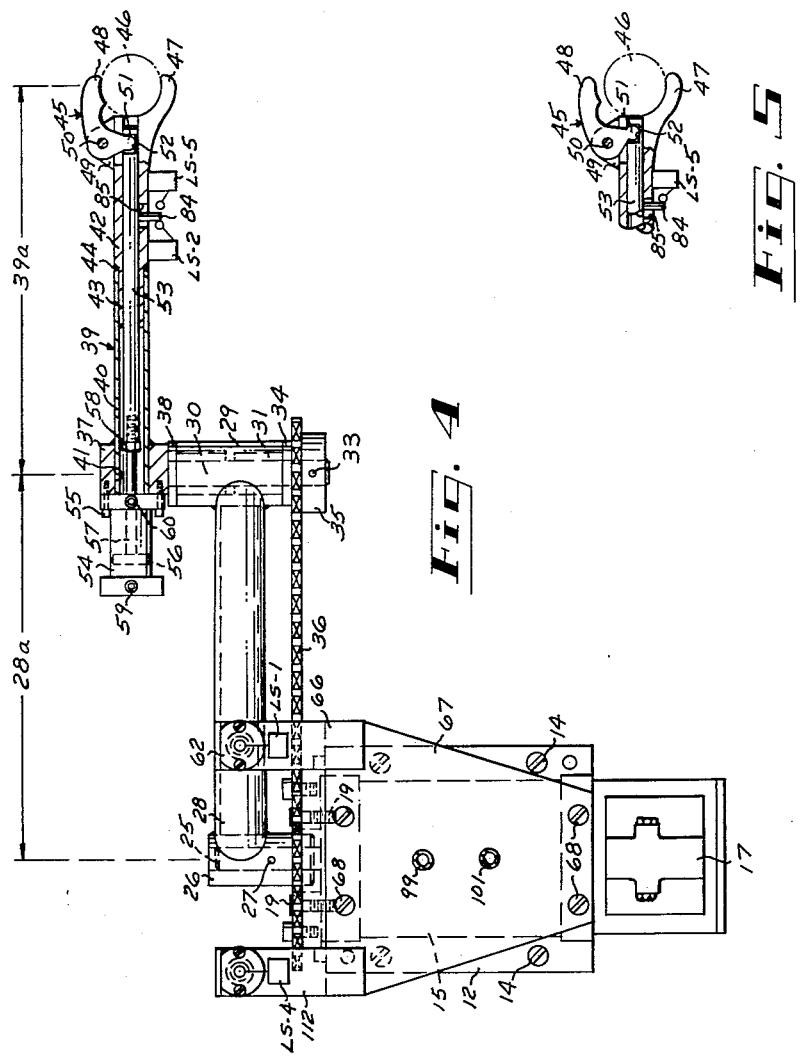

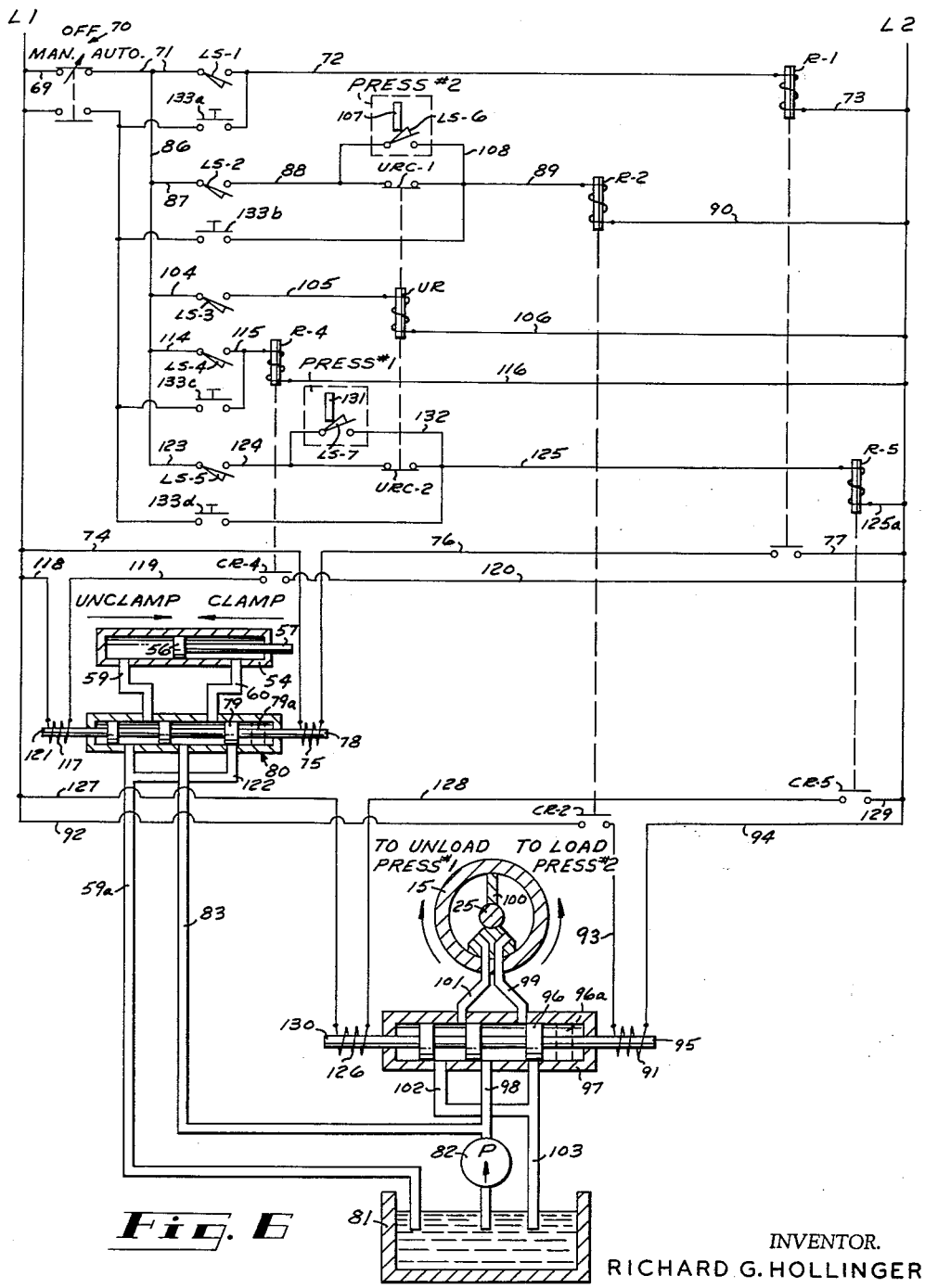

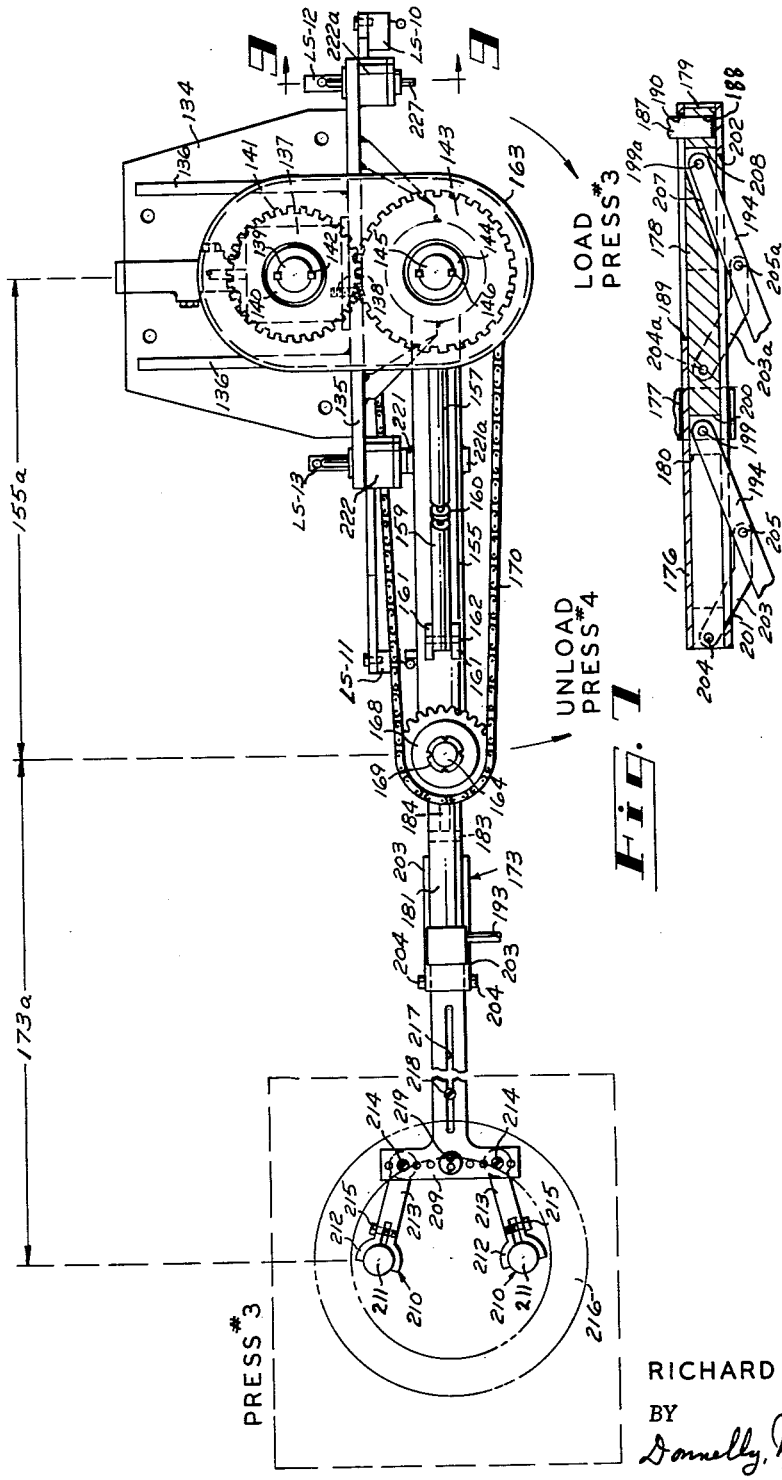

Nov. 28, 1961 R. G. HOLLINGER 3,010,587
WORKPIECE TRANSFER MECHANISM
Filed Sept. 20, 1957 9 Sheets-Sheet 6
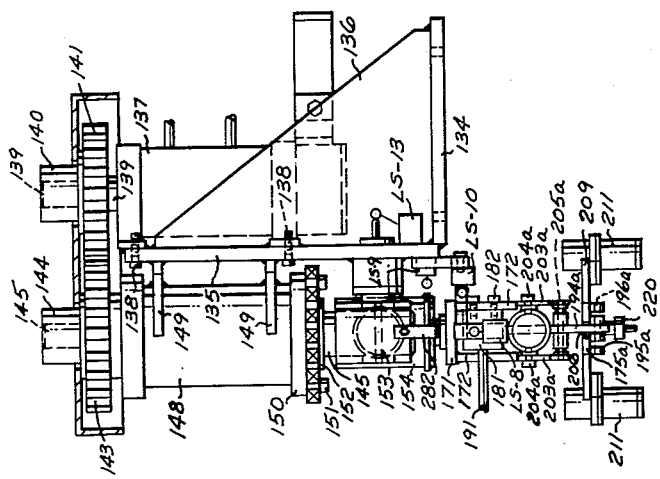
INVENTOR.
RICHARD G. HOLLINGER
BY
Donnelly, Mentag & Harrington
ATTORNEYS

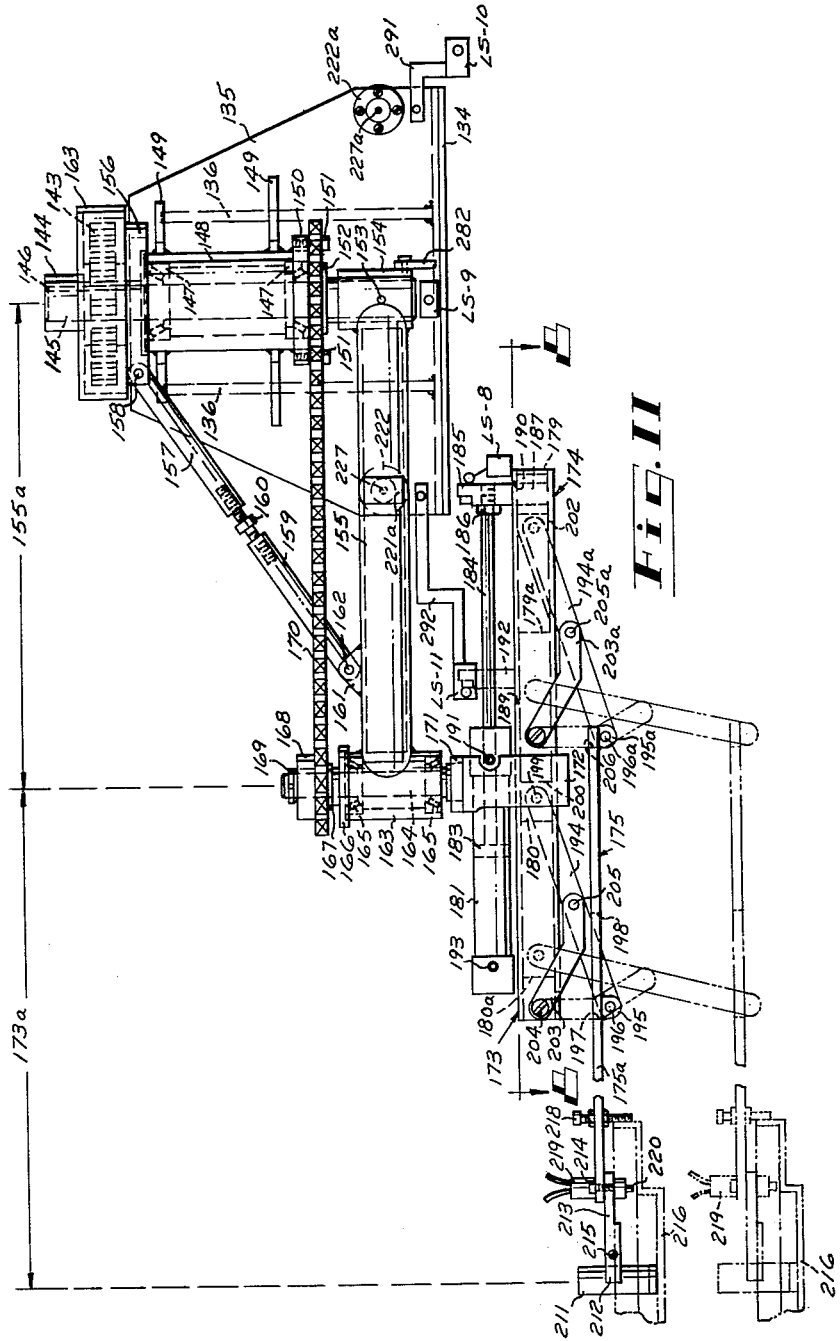

INVENTOR.
RICHARD G. HOLLINGER

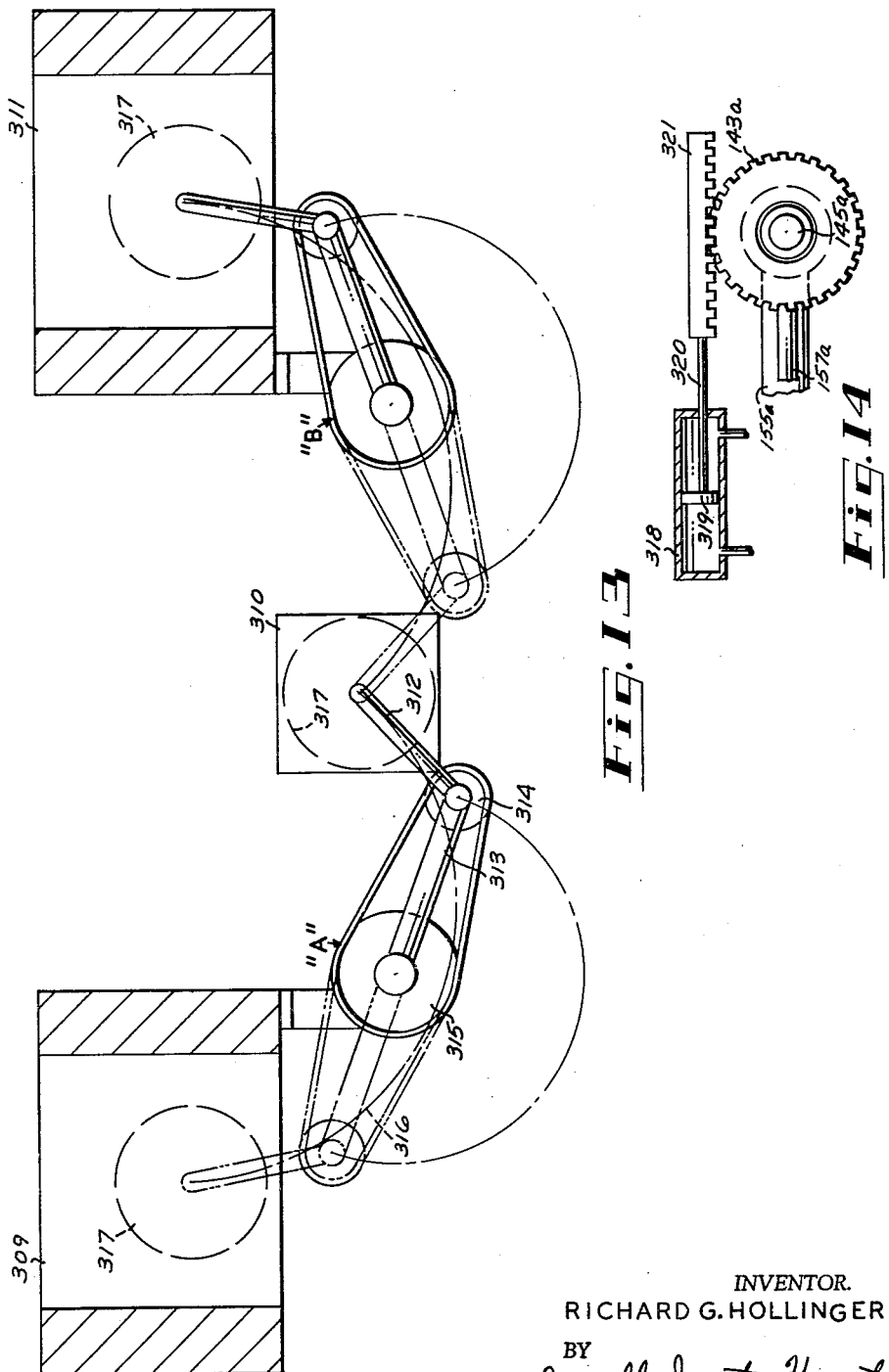

United States Patent Office 3,010,587
Patented Nov. 28, 1961

3,010,587
WORKPIECE TRANSFER MECHANISM
Richard G. Hollinger, 10745 Kingston, Huntington Woods, Mich.
Filed Sept. 20, 1957, Ser. No. 685,269
2 Claims. (Cl. 214—1)

This invention relates to improvements in workpiece transfer or handling mechanisms, and, more particularly to a novel workpiece transfer or handling mechanism for loading and unloading machine tools as pressing machines, drilling machines, milling machines, and the like.

At the present time, industry has automated many metal working and assembly operations whereby a series of operations may be carried out on a workpiece without being touched by a human being. In order to carry out such series of operations, it is necessary to have transfer devices or mechanisms to transfer the workpieces from one machine to another, and, accordingly, it is the primary object of this invention to provide a novel and improved workpiece transfer mechanism to carry out such transfer operations.

It is another object of this invention to provide a workpiece transfer mechanism which may be adapted to transfer a workpiece from a first location to a second location along either a rectilinear path or a curved path, as desired, by constructing the relative effective lengths of a pair of arms of the mechanism and the relative number of teeth on a pair of sprocket wheels of the mechanism, in accordance with certain predetermined ratios.

It is a further object of this invention to provide a workpiece transfer mechanism which may be adapted to transfer a workpiece from a first location to a second location along a path of movement including a vertical upward movement followed by either a horizontal rectilinear or curved movement and ending with a vertical downward movement.

It is a still further object of this invention to provide a workpiece transfer mechanism of the class described which is adapted to provide positive positioning of a workpiece in a work location, and which is compact and rugged in construction, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 2 is a top plan view of a transfer mechanism as illustrated in FIG. 1;

FIG. 3 is an end elevational view, with parts broken away, of the structure illustrated in FIG. 2, taken in the direction of the arrow marked "3";

FIG. 4 is a front elevational view, partly in section, of the structure illustrated in FIG. 2, taken in the direction of the arrow marked "4";

FIG. 5 is a fragmentary view, partly in section, of the releasable workpiece gripping member of the transfer mechanism illustrated in FIG. 4, and showing this member in an inoperative position;

FIG. 6 is a schematic representation of the electrical and hydraulic control circuits for the embodiment of FIGS. 1 through 5;

FIG. 7 is a top plan view of a second illustrative embodiment of the invention;

FIG. 8 is a fragmentary elevational sectional view of the structure illustrated in FIG. 11, taken along the line 8—8, and looking in the direction of the arrows;

FIG. 9 is a fragmentary elevational sectional view of the structure illustrated in FIG. 7, taken along the line marked 9—9 and looking in the direction of the arrows;

FIG. 10 is an end elevational view, with parts broken away, of the structure illustrated in FIG. 7, taken from the right side thereof as viewed in FIG. 7;

FIG. 11 is a front elevational view of the structure illustrated in FIG. 7;

FIG. 13 is a diagrammatic view of a third illustrative embodiment of the invention; and FIG. 14 is a diagrammatic view of a rack and gear drive means adapted for use in the invention.

Figure 1:
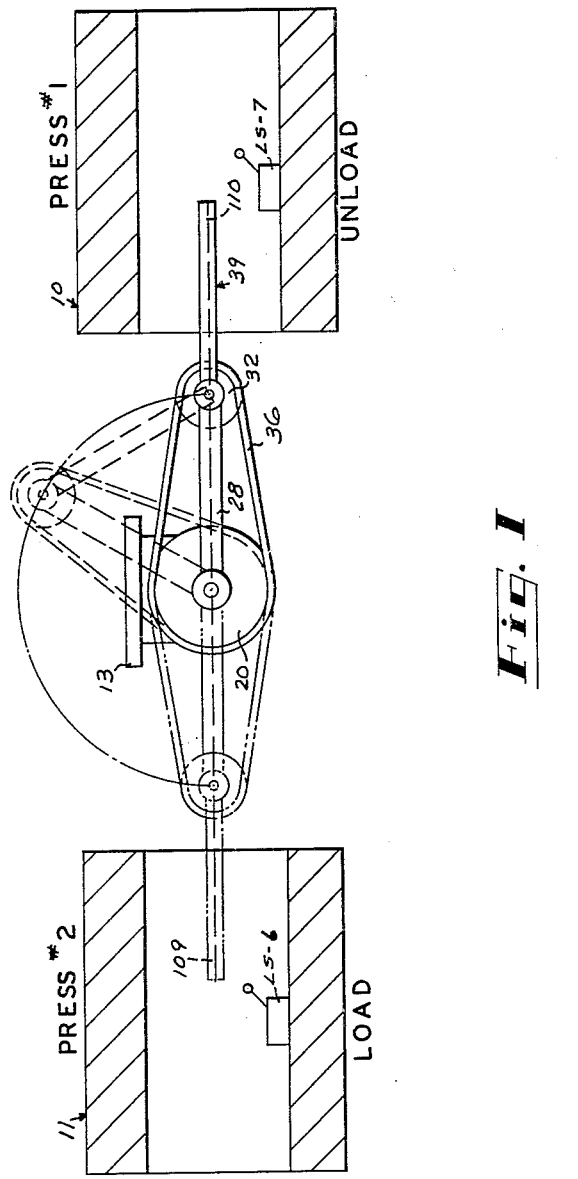
FIG. 1 is a diagrammatic view of a first illustrative embodiment of the invention.

Referring now to the drawings, FIG. 1 illustrates schematically a first illustrative embodiment of a work transfer mechanism made in accordance with the principles of the invention, for transferring a workpiece from a first press, generally indicated by the numeral 10, to a second press, generally indicated by the numeral 11, along a straight line or rectilinear path. The structure of the embodiment of FIG. 1 is shown in detail in FIGS. 2 through 5. As shown in FIGS. 2 and 3, this first embodiment includes a support means comprising a vertical plate 12 which is fixedly mounted on a support member 13 which may be any ground engaging member or any suitable support member. The plate 12 is suitably connected to the support member 13 by any suitable means, as by the bolts 14. A reversible power drive means 15 is fixedly mounted on the vertical plate 12 by means of the bolts 16. This reversible drive means is illustrated as having a conventional reciprocable or reversible hydraulic fluid motor, although it will be understood that a reversible pneumatic motor or reversible electric motor could be used instead of the hydraulic motor shown. The numeral 17 merely indicates a conventional speed control unit which operates with the hydraulic motor 15. A suitable hydraulic reversible motor adapted for use with the invention is one which is available on the market and manufactured by Tork Mor Inc. of Detroit, Michigan.

As shown in FIGS. 2 and 3, a horizontal support plate 18 is fixedly secured to the upper end of the casing of the motor 15 by means of the bolts 19. A stationary sprocket wheel 20 is adjustably secured to the upper face of the support plate 18 by means of the bolts 21. An elongated slot, as 22, is formed in the sprocket 20 at each of the bolt positions 21, whereby the sprocket 20 may be adjusted, as desired. The sprocket wheel 20 is provided with an axial aperture 23 and a plurality of offset apertures 24 through which the bolts 19 are adapted to pass to permit rotary adjustment of the sprocket 20.

As shown in FIGS. 2, 3 and 4, a first shaft 25, and in this case the output shaft of the rotary motor 15, extends vertically upwardly through the axial aperture 23 and extends above the sprocket 20. Fixedly mounted on the shaft 25 is a vertical sleeve or hub 26. A transversely disposed lock pin 27 secures the hub 26 on the shaft 25. An inner or horizontal main radial arm 28 is fixedly connected at the inner end thereof to the hub 26, by any suitable means, as by welding. A second vertical sleeve or hub 29 is fixedly connected to the outer end of the arm 28 by any suitable means, as by welding. A second vertical shaft 30 is suitably rotatably mounted in the hub 29, by means of a suitable bearing means 31.

As best seen in FIGS. 2 and 4, a rotary sprocket wheel 32 is fixedly carried on the lower end of the shaft 30 and is secured thereto by means of the lock pin 33. The sprocket wheel 32 is disposed on the shaft 30 between the two suitable bearing members 34 and 35. A sprocket chain 36 is operatively mounted around the sprocket wheels 20 and 32.

A cylindrically shaped head member 37 is fixedly mounted, by any suitable means, on the upper end of the rotary shaft 30. A suitable bearing plate 38 is interposed between the head member 37 and the upper end of the hub 29. As best seen in FIGS. 2 and 4, a horizontal outer or auxiliary radial arm, generally indicated by the numeral 39, is fixedly secured to the head member 37 and comprises an inner cylindrical portion 40 having the open inner end thereof fixedly mounted in the horizontal aperture 41 in the head member 37. The arm 39 further includes an outer cylindrical end portion fixed to the inner portion 40, as follows. The outer cylindrical end portion comprises the hollow cylinder part 42 which is reduced on the inner end thereof, as at 43, and which reduced end is telescopically mounted in the open outer end of the arm portion 40 and fixed therein by any suitable means, as by welding, as indicated by the numeral 44.

As shown in FIGS. 2, 4 and 5, a means for releasably gripping a workpiece, as for example, the bar 46, is carried on the auxiliary arm 39 and is generally indicated by the numeral 45. The gripping means 45 includes a lower stationary work clamp 47 which is fixed to the front end of the arm portion 42, and a movable clamping jaw 48 hingedly mounted diametrically opposite to the jaw 47 on the arm portion 42 between the vertical spaced apart pads on the pin 50.

As best seen in FIG. 4, the movable clamping jaw 48 carries an integral downwardly extended cam finger 51 which extends into the cam slot 52 which is formed in the outer end of the elongated cam rod 53 which is slidably mounted inside of the auxiliary arm 39. Fixedly mounted on the head member 37, by means of the bolts 55, is the hydraulic cylinder 54 in which is slidably mounted the usual piston 56 and the piston rod 57. The piston rod 57 extends into the arm 39 and is threadably connected to the inner end of the cam rod 53 and secured in place by the lock nut 58. In order to unclamp the workpiece 46, hydraulic fluid under pressure is admitted to the cylinder 54 through the conduit 59 whereby the piston 56 will move the rods 57 and 53 to the right, as viewed in FIG. 4, and the movable jaw 48 will be moved upwardly to the position shown in FIG. 5 to unclamp the workpiece. In order to clamp the workpiece 46 in place, fluid under pressure is admitted to the cylinder 54 through the conduit 60 whereby the piston 56 will be moved to the left, as viewed in FIG. 4, and the rods 57 and 53 will also be moved to the left whereby the jaw 48 will be cammed into a clamping or gripping engagement with the workpiece 46.

The embodiment of FIGS. 1 through 6 is adapted to move the workpiece 46 from the press 10 to the press 11 along a straight path, and this action will be effected if the effective lengths of the arms 28 and 39 are equal. That is, as shown in FIG. 4, the effective lengths are indicated by the numerals 28a and 39a. The effective length 28a would be measured from the axis of the first shaft 25 to the axis of the second shaft 30, and the effective length 39a would be measured from the axis of the second shaft 30 to the centerline of the workpiece gripping means. In order to obtain the straight line action of the work transfer mechanism, the ratios between the stationary sprocket 20 and the rotary sprocket 32 must be equal to a ratio of two to one. It will be obvious that pulleys could be substituted for the sprocket wheels 20 and 32 and that a V-belt could be then used instead of the sprocket chain 36. However, the use of sprockets and chains provides a positive work transfer action with no slippage or lost motion.

The operation of the embodiment of FIGS. 1 through 6 will be best understood if it is assumed that the arms 28 and 39 have just been moved into the position shown in FIG. 2. In this case, the stop pad 61 on the arm 28 will abut the stop member, generally indicated by the numeral 62, and this stop member is best seen in FIGS. 2 and 4. The stop member 62 comprises the hollow cylinder 63 in which is slidably mounted the elongated rod 64 which is normally biased inwardly or toward the support member 13, as viewed in FIG. 2, by means of the spring 65. The stop member 62 limits the movement of the arm 28 and is mounted on the vertical support arm 66 which is fixedly mounted, as by welding, on the vertical support plate 67 which is secured to the casing of the motor 15, by means of the screws 68.

When the rod 64 is pushed inwardly of its cylinder, the rear ends thereof closes the limit switch LS1 which is fixedly carried on the member 66. As shown in the circuit of FIG. 6, the limit switch LS1 is connected between the power lines L1 and L2 by means of the lead 69, the master switch 70, and the leads 71, 72 and 73, and the relay coil R1 of an electro magnetic relay. The master switch 70 would, of course, be moved to the automatic position, as shown in FIG. 6. The power lines L1 and L2 would, of course, be connected to a suitable source of alternating current. When the relay coil R1 is energized, the relay contacts CR1 will be closed so as to complete a circuit to energize the solenoid coil 75 through the leads 74, 76 and 77. When the solenoid coil 75 is energized, the solenoid armature bar 78 will be moved to the left, as viewed in FIG. 6, to the position shown in FIG. 6, whereby the valve spool 79 of the directional flow control valve 80 will be positioned to admit fluid into the cylinder 54 through the conduit 60. As shown in FIG. 6, a suitable hydraulic fluid reservoir 81 would be provided from which a suitable hydraulic pump 82 would pump hydraulic fluid under pressure through the conduit 83, the valve 80, and the conduit 60, and into the cylinder 54 so as to move the piston 56 to the left, as viewed in FIGS. 4 and 6, to the clamping position. The hydraulic fluid in the other end of the cylinder 54 would be exhausted back to the reservoir 81 through the conduit 59, the valve 80, and the conduit 59a. As shown in FIG. 4, a downwardly extended cam dog 84 is fixedly connected to the rod 53 and extends through the slot 85 in the arm 39. When the rod 53 is moved to the clamping position, as shown in FIG. 4, so as to grip the workpiece 46 between the jaws 47 and 48, the dog 84 would engage and close the limit switch LS2 to complete a circuit through the lead 69, switch 70, leads 86, 87, 88 and 89 and 90, the relay coil R2 and through the normally closed unlatching relay contacts URC1. The normally open relay contacts CR2 are thus closed so as to energize the solenoid coil 91 through the leads 92, 93 and 94. The solenoid armature bar 95 will be actuated in the usual manner towards the left, as viewed in FIG. 6 so as to move the valve spool 96 of the directional flow control valve 97 into the position shown in FIG. 6. Hydraulic fluid under pressure from the pump 82 will then flow through the conduit 98, the valve 97 and the conduit 99 to the motor 15 so as to rotate the rotatable vane 100 in a counter clockwise direction, as viewed in FIG. 6. The vane 100 is connected in the usual manner to the shaft 25 and, accordingly, the main arm 28 will be rotated counter clockwise. The rotating sprocket 32 on the shaft 30 will be rotated in a clockwise direction, as viewed in FIG. 2, and the outer arm 39 will rotate about the axis of the shaft 30 in a clockwise direction, as viewed in FIGS. 1 and 2. Fluid will be exhausted from the other side of the vane 100 of the motor 15 through the conduit 101, the valve 97, and the conduits 102 and 103, back to the reservoir 81.

When the inner arm 28 moves past the limit switch LS3, as shown in FIGS. 2 and 3, it will engage this limit switch and will complete a circuit to energize the unlatch relay UR to stop the arm in the central position, if the press number two is not ready to receive a workpiece. When the limit switch LS3 is closed, it will complete a circuit through the leads 104, 105 and 106 to energize the unlatch relay. When the unlatch relay UR is energized, the normally closed contacts URC1 are opened and the arm 28 is stopped, since the relay R2 is deenergized, thereby stopping the motor 15. However, if the press number two is ready to receive a workpiece, then a suitable part, as 107, which may be carried on the moving part of the press number two, as for example on the ram thereof, will close the limit switch LS6 to indicate that press number two is ready to receive a workpiece. When the limit switch LS6 is closed, the URC1 contacts are bypassed through the lead 108 and the relay coil R2 is again energized and motor 15 will operate to continue the movement of the arm 28 to the press number two. When the workpiece 46 is moved from the press one to the press number two, the outer arm 39 will be moved to the dotted position indicated by the numeral 109, and the workpiece will follow a straight line indicated by the dotted line 110.

When the arm 39 reaches the dotted position 109, the pad 61a on the arm 28 will hit the stop member, generally indicated by the numeral 111 which is constructed to be the same as the stop member 62. The stop member 111 is mounted on the vertical support arm 112 which is fixed on the plate 67. The rod 113 in the stop member 111 will be moved outwardly and will engage the limit switch LS4 which is carried on the arm 112. When LS4 is closed, a circuit is completed through the leads 114, 115, 116 and the relay coil R4, whereby the normally open relay contacts CR4 are closed so as to energize the solenoid coil 117 through the leads 118, 119 and 120. The solenoid armature bar 121 will be moved in the usual manner to the right as viewed in FIG. 6, so as to move the valve spool 79 to the right to the dotted position indicated by the numeral 79a. The workpiece will be unclamped by this action since fluid will move from the pump 82 through the conduit 83, the valve 80, and the conduit 59, into the left end of the cylinder 54 so as to move the piston 56 to the right, as viewed in FIG. 6. Fluid will be exhausted from the right end of the cylinder 54 through the conduit 60, the valve 80, and the conduits 122 and 59a back to the reservoir 81.

As viewed in FIG. 5, when the cam dog 84 moves to the right, it engages and closes the limit switch LS5 and completes a circuit to energize the relay coil R5 through the leads 123, 124, 125, 125a and the normally closed contacts URC2. When relay coil R5 is energized, the normally open contacts CR5 will be closed to energize the solenoid coil 126 through the leads 127, 128 and 129. The solenoid armature bar 130 will be moved to the right, as viewed in FIG. 6, to the dotted position indicated by the numeral 96a, whereby the fluid motor 15 will be reversed and the arm 28 will be moved clockwise. It will be seen that when the valve spool 96 is to the dotted position 96a, fluid from the pump 82 will flow through the conduit 98, the valve 97, the conduit 101, and into the motor 15 so as to rotate the vane 100 in a clockwise direction. Fluid will be exhausted from the other side of the motor vane 100 back to the reservoir 81 through the conduit 99, valve 97, and conduit 103.

When the arm 28 reaches the midway position between the presses one and two, it will again engage the limit switch LS3 to actuate the unlatch relay UR in the same manner as was explained hereinbefore. If press one is ready to be unloaded, then a part, as 131, which may be operatively mounted on some moving part of the press one, would close the limit switch LS7 which would be mounted on the press one, and the contacts URC2 would be bypassed by means of the lead 132 and relay R5 would again be energized and the motor 15 would continue to rotate the arms 28 and 39 back to the position shown in FIGS. 3 and 4.

The aforedescribed operation or cycle would then be repeated if the switch 70 is maintained in the automatic position. If it is desired to manually actuate the limit switches LS1, LS2, LS4 and LS5, this may be done by moving the switch 70 to the manual position and by selectively operating the manually operable switches, indicated in FIG. 6 by the numerals 133a, 133b, 133c and 133d, to operate these limit switches, respectively.

FIGS. 7 through 12 illustrate a second embodiment of the invention which is adapted to transfer a workpiece along a rectilinear path between two points. This second embodiment, however, is provided with an auxiliary arm which includes a vertically movable portion for providing a vertical loading movement at each of said two points. The numeral 134 indicates a horizontal support plate to one end of which is fixedly secured as by welding the vertical support plate 135. As best seen in FIGS. 7 and 10, the plates 134 and 135 are provided with a pair of spaced apart vertical backing plates 136. The plates 134, 135 and 136 form a support means for the transfer mechanism.

Fixedly mounted on the back side of the plate 135 by means of the bolts 138 is the reversing or reciprocating hydraulic motor 137 which is the same type of motor as motor 15. The motor 137 is provided with a vertical output shaft 139, extending from the upper end thereof, which is fixedly connected to the hub 140 of the drive gear 141 by means of the lock keys 142. As shown in FIGS. 7, 10 and 11, the drive gear 141 is horizontally disposed and meshably engages the horizontal driven gear 143 which has a hub 144 which is fixed on the upper end of a first rotatable shaft 145 by means of the lock keys 146. The shaft 145 is suitably rotatably supported by the bearing members 147 which are operatively mounted in the vertically disposed cylinder 148. The cylinder 148 is fixedly mounted on the spaced apart horizontal brackets 149 which are fixedly mounted on the outer face of the vertical plate 135.

An annular member 150 is fixedly mounted on the lower end of the cylinder 148, as by welding, and fixedly secured to the lower side of the member 150 by means of the screws 151 is a stationary sprocket wheel 152, and the lower end of the shaft 145 passes through an axial aperture in this wheel. Fixedly mounted on lower end of the shaft 145 is a vertical sleeve or hub 154 which is secured in place by means of the lock pin 153. An inner or main horizontal radial arm 155 is fixedly connected at the inner end thereof to the hub 154, by any suitable means, as by welding. The arm 155 is provided with additional bracing means comprising a rotatable collar 156 which is rotatably mounted on the upper end of the cylinder 148 and to which is hingedly connected the upper brace or arm 157 by means of the pin 158. The arm 157 is adjustably connected to the lower brace or arm 159 by means of the screw means 160. The lower end of the arm 159 is pivotally connected to the spaced apart pads 161 by means of the pin 162, and the pads 161 are fixedly mounted on the arm 155 by any suitable means, as by welding.

A second vertical sleeve or hub 163 is fixedly connected to the outer end of the arm 155 by any suitable means, as by welding. A second vertical shaft 164 is suitably rotatably mounted in the hub 163, by means of the bearing members 165. As shown in FIGS. 7 and 11, bearing plate 166 is rotatably mounted on the upper end of the sleeve 163 around the shaft 164 and is provided with an upwardly spaced hub 167 on which is disposed a rotary sprocket wheel 168. The bearing member or plate 166 is fixed on the shaft 164 by any suitable means, and the sprocket wheel 168 is secured to the member 166 and the shaft 164 by means of the lock nut 169. A sprocket chain 170 is operatively mounted around the sprocket wheels 152 and 168.

As best seen in FIGS. 10 and 11, a horizontal plate 171 is fixedly connected to the lower end of the shaft 164 and fixed to the plate 171 is the spaced apart pair of downwardly extending vertical legs 172. The plate 171 and the legs 172 coact to form a yoke member which carries a second horizontal or auxiliary radial arm, generally indicated by the numeral 173. Whereas the first embodiment of FIGS. 2 through 6 disclosed a transfer mechanism having an auxiliary arm comprising a one-piece elongated member, this second embodiment includes an auxiliary arm comprising an upper inner portion 174, and a lower outer portion 175 which is movable vertically relative to its upper portion.

As best seen in FIGS. 7, 8 and 11, the upper arm portion 174 includes a horizontal open-ended cylindrical member 176 in which is slidably mounted an elongated bar 178 which is circular in cross section and which terminates at the rear end thereof at the point marked 179 and at the front end thereof at the point marked 180. A conventional hydraulic fluid cylinder 181 is horizontally mounted on the front end of the arm portion 174 between the legs 172 to which it is fixedly secured by means of the screws 182, and this is best seen in FIGS. 10 and 11. The cylinder 181 is provided with the usual piston 183 to which is fixedly connected the piston rod 184 the outer end of which is threadably mounted in the vertical arm 185 and secured in place relative thereto by means of the lock nut 186. The lower end 187 of the arm 185 is secured in the vertical aperture 188 in the right end of the bar 178, as viewed in FIGS. 8 and 11, by any suitable means, as by a press fit. A central longitudinal slot is cut in the upper side of the member 176 and extends from the point 189 back to the point 190, and the lower end of the arm 185 extends through this slot. When fluid under pressure is admitted into the cylinder 181 through the inlet conduit 191 the arm 185 will be moved forwardly to the dotted position marked 192, and when fluid is next admitted into the cylinder 181 through the inlet conduit 193 the arm 185 will be moved back to the solid line position shown in FIG. 11.

As shown in FIGS. 8, 10 and 11, the lower arm portion 175 includes the elongated flat bar 175a, to an intermediate part thereof which is connected the lower end of the elevator arm 194. The lower end of the arm 194 is hingedly connected to the pads 195 by means of the pin 196 and the spaced apart pads 195 are fixedly secured to the underside of the bar 175a by any suitable means, as by welding. The lower end of the arm 194 extends through a central longitudinal slot formed in the bar 175a and which slot extends between the points marked 197 and 198. The upper end of the arm 194 is hingedly connected in a central slot in the front end of the bar 178 by means of the pin 199 and this central slot extends backwardly from the front end of the bar 178 to the point indicated by the numeral 200. The arm 194 enters the cylindrical member 176 through a longitudinal central slot formed in the lower end of the member 176 and this slot extends from the forward point 201 backwards to the rear point 202.

As shown in FIGS. 8, 10 and 11, a pair of guide levers as 203 is interconnected between the arm 194 and the upper arm portion 176. The upper ends of the arm guide levers 203 are hingedly connected to the opposite sides of the portion 176 by means of suitable pins as 204 and the lower angled ends are hingedly connected to the medial point of the arm 194 by means of the pivot pin 205. The rear end of the bar 175a is carried by a second elevator arm and guide lever construction as just described and the corresponding parts are marked with corresponding numerals followed by the small letter "a." The lower end of the arm 194a passes through the slot 206 formed centrally in the end of the bar 175a, and the upper end of the arm 194a operates in the slot in the bar 178 which is bounded by the lines 207 and 208. The cylindrical member 176 is disposed between the yoke legs 172 and is fixedly secured to these legs as by welding as indicated by the numeral 177.

As shown in FIGS. 7, 10 and 11, a means for releasably gripping a workpiece as 216, is carried on the arm lower portion 175 at the front end 209 thereof and is generally indicated by the numeral 210. The workpiece gripping means includes a pair of permanent magnets as 211 which are clamped between the jaws 212 carried on the arms 213, the inner ends of which are adjustably secured to the crosshead part 209 by means of the screws 214. The jaws 212 are adjustable by means of the screws 215. As best seen in FIGS. 8 and 11, the outer end of the arm portion 175a is provided with a central longitudinal slot 217 through which is adjustably mounted the bolt 218 which functions as a workpiece abutment member. A solenoid 219 is fixedly mounted on the bar part 209 for unloading the workpieces 216 from the permanent magnets 211. The numeral 220 indicates the plunger of the solenoid which would be actuated downwardly when the solenoid is energized to thereby knock the workpiece 216 from the magnets 211.

The embodiment of FIGS. 7 through 12 is adapted to move the workpiece 216 from a first press situated at one level along a straight line path to a second press situated at a different level, or the same level if desired. This straight line action is again effected if the effective lengths of the arms 155 and 173 are equal. That is, as shown in FIG. 7, the effective lengths are indicated by the numerals 155a and 173a. The effective length 155a would be measured from the axis of the shaft 145 to the axis of the second shaft 164, and the effective length of the auxiliary arm 173 would be measured from the axis of the second shaft 164 to the centerline of the magnets or workpiece gripping means. The number of teeth on the sprocket 152 would also have to be equal to twice as many as are on the sprocket 168, or be in the ratio of 2 to 1.

The operation of the embodiment of FIGS. 7 through 12 will be best understood if it is assumed that the arms 155 and 173 have just been moved into the position shown in FIGS. 7 and 11. In this case, the stop pad 221 on the arm 155 will abut the stop member generally indicated by the numeral 222 and the structure of stop member 222 is the same as stop member 222a as shown in FIG. 9. These stop members include a cylindrical body 223 which is provided with an axial hole as 224. The body 223 is fixed on the vertical plate 135 as by welding. The plate 135 is provided with a hole 225 therethrough which is aligned with the hole 224 and slidably mounted in the hole 224 is the piston 226 which carries the elongated actuator rod 227. A spring 228 normally biases the rod piston 226 toward the front side of the plate 135. The front end of the hole 224 is enclosed by the plate 229 which is secured on the body 223 by the screws 230. The rear end of the hole 225 is enclosed by the plate 231 which is secured on the plate 135 by the screws 232. The rod 227 extends through suitable apertures in the plates 229 and 231.

Figure 12:
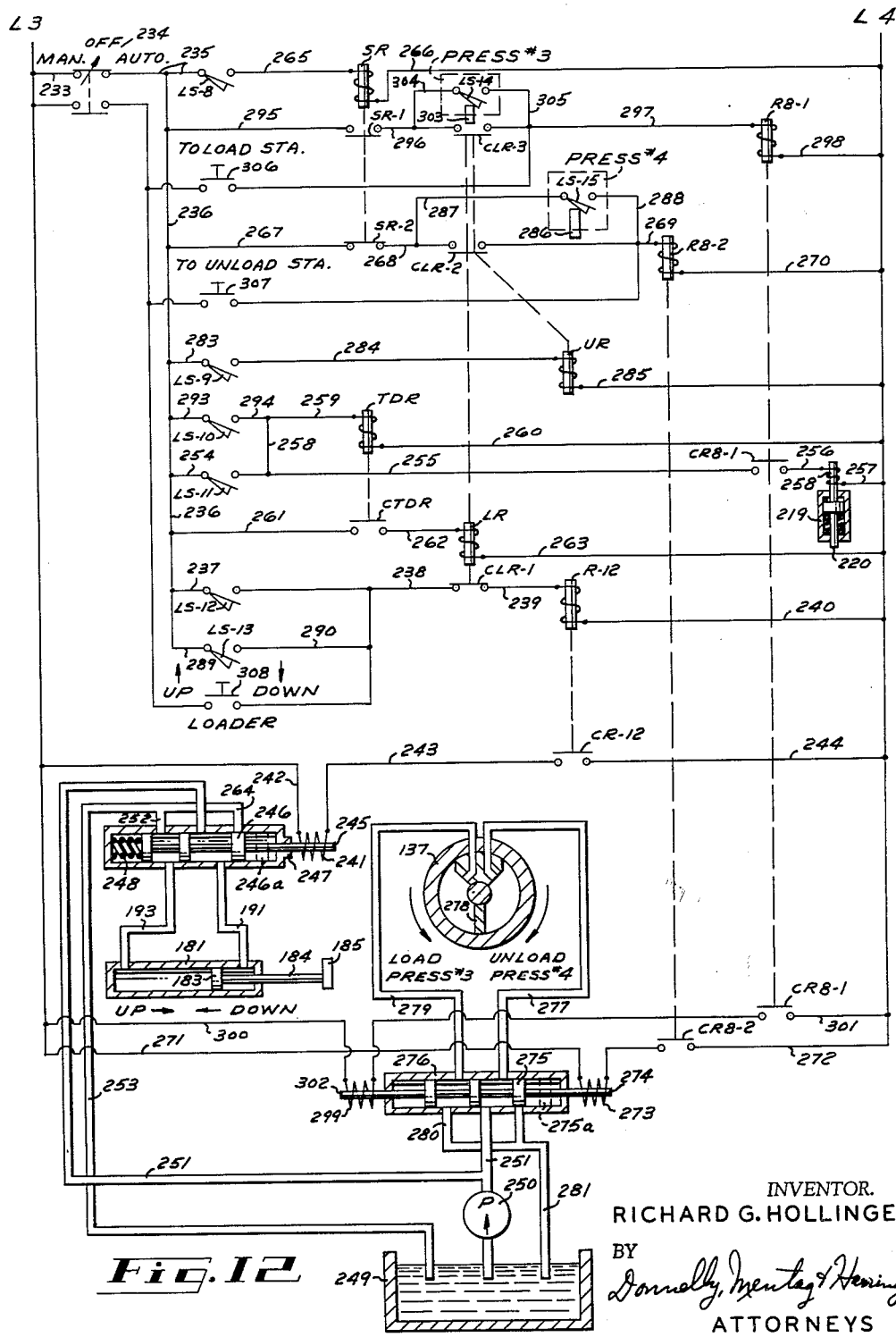
FIG. 12 is a schematic representation of the electrical and hydraulic control circuits for the embodiment of FIGS. 7 through 11.

When the rod 227 of stop member 222 is pushed inwardly of its body, the rear end thereof closes the limit switch LS12 which is fixedly carried on the rear side of the plate 135. As shown in the circuit of FIG. 12, the limit switch LS12 is connected between the power lines L3 and L4 by means of the lead 233, the master switch 234, the leads 235, 236, 237, 238, 239 and 240, the normally closed contacts CLR–1 and the relay coil R12 of an electro magnetic relay. The master switch 234 would, of course, be moved to the automatic position, as shown in FIG. 6, to put the mechanism in automatic operation. The power line L3 and L4 would be connected to a suitable source of alternating current. When the relay coil R12 is energized, the relay contacts CR12 will be closed so as to complete a circuit to energize the solenoid coil 241 through the leads 242, 243 and 244. When the solenoid coil 241 is energized, the solenoid armature bar 245 will be moved to the left as viewed in FIG. 12, to the position shown in FIG. 12, whereby, the valve spool 246 of the directional flow control valve 247 will be positioned to admit fluid into the cylinder 181 through the line 191. The solenoid bar 245 works against the action of the spring 248 which normally tends to bias the valve spool 246 towards the right as viewed in FIG. 12.

As shown in FIG. 12, a suitable hydraulic fluid reservoir 249 would be provided from which a suitable hydraulic pump as 250 would pump hydraulic fluid under pressure through the conduit 251, the valve 247, and the conduit 191, and into the cylinder 181 so as to move the piston 183 to the left, as viewed in FIGS. 11 and 12. As the piston 183 is moved to the left the rod 184 carries the arm 185 which in turn moves the bar 178 forwardly. The arms 194 and 194a will be moved to the dotted line position shown in FIG. 11 and the arm portion 175 will also assume the dotted line position of FIG. 11. It will be seen that the arm portion 175 is thus moved straight downwardly from its solid line position of FIG. 11.

When the arm 185 reaches the dotted line position marked 192 in FIG. 11 it will engage the limit switch LS11. In the meantime, hydraulic fluid has been exhausted from the other end of the cylinder 247 back to the reservoir 249 through the conduits 252 and 253. The closing of LS11 by the arm 185 completes a circuit through the leads 236, 254, 255, 256 and 257, the contacts CR8–1 and the unload solenoid coil 258. The solenoid 219 will operate and the workpiece 216 will be deposited in the press #3. When the limit switch LS11 was closed, it also completed a second circuit through the leads 236, 254, 255, 258, 259 and 260, and the time delay relay coil TDR. The energization of the TDR coil closes the normally open contacts CTDR which completes a further circuit through the leads 261, 262 and 263 and the relay coil LR. When the coil LR is energized it opens the normally closed contacts CLR–1 to deenergize the solenoid coil 241, whereby the spring 248 will move the valve spool 246 to the right as viewed in FIG. 12 to the dotted position 246a. Fluid under pressure from the pump 250 will then pass through the conduit 251, the valve 247, and the line 193 and will move the piston 183 to the right, as viewed in FIGS. 11 and 12. Fluid will be exhausted from the other end of the cylinder 247 through the conduit 191, valve 247, and conduits 264 and 253 back to the reservoir 249. The lower arm portion 175 will again be moved upwardly to the full line position shown in FIG. 11.

As the arm 185 reaches the solid line position shown in FIG. 11, it will contact limit switch LS8 whereby a circuit will be completed through the leads 235, 265 and 266, and the sequence relay coil SR. The sequence relay contacts SR–2 will be closed and a circuit will be completed through the leads 236, 267, 268, 269 and 270 and the relay coil R8–2. The contacts CLR–2 will have been previously closed when LS11 was closed. The contacts CR8–2 will be closed and will complete a circuit through the leads 271 and 272 and the solenoid coil 273 whereby the armature bar 274 will be moved inwardly, or to the left as viewed in FIG. 12, and the valve spool 275 of the flow directional control valve 276 will be moved to the position shown in FIG. 12. Hydraulic fluid under pressure from the pump 250 will then flow through the conduit 251, the valve 276, and conduit 277 into the hydraulic motor 137 and will actuate the motor vane 278 in a clockwise direction. Fluid from the other side of the vane 278 will be exhausted back to the reservoir 249 through the conduit 279, the valve 276, and conduits 280 and 281.

The drive gear 141 will drive the driven gear 143 in a counter-clockwise direction, as viewed in FIG. 7, and the main radial arm 155 will also be turned counter-clockwise around the axis of shaft 145. The outer arm 173 will be turned clockwise about the axis of the shaft 164.

When the arm 155 reaches the mid-point of its travel the trip-dog 282 carried on the hub 154 will close the limit switch LS9 which is fixed on the front face of the vertical plate 135, and the closing of this limit switch completes a circuit through the leads 283, 284 and 285 and the unlatch relay UR. The UR relay is connected to the contacts CLR–2 and CLR–3 and when this relay is operated these contacts are opened thus breaking the control circuits for the motor 137 which will stop. The transfer mechanism will stop in the medial or mid-point travel position unless the circuit broken by the UR relay is again made by the limit switch LS15 which would be mounted on the press #4 (not shown). The limit switch LS15 would be operated by some part of the press #4 as a dog 286 carried on the moving ram part of the press, and the actuation of the LS15 would indicate that press #4 is clear and ready to be unloaded. The limit switch LS15 bypasses the contacts CLR–2 and will keep the motor 137 working if it is closed before the UR relay works. The leads 287 and 288 would coact with the LS15 to bypass the contacts CLR–2.

When the arm 155 reaches the position for unloading the press #4 the stop pad 221a will engage the stop member 222a and the rod 227a thereof will close the limit switch LS13. The limit switch LS13 is carried on the back side of the vertical plate 135 and when closed functions in the same manner as limit switch LS12. It is connected in parallel with the limit switch LS12 by means of the leads 289 and 290. Accordingly, the lower portion 175 of arm 173 will again be lowered. The arm 185 will move forwardly until it hits the limit switch LS10 which is held on the arm 291 adjacent the path of movement of the arm 185. The limit switch LS11 is also held on a similar arm 292. The arms 291 and 292 are carried on the plate 135. It will be seen that the distance that the lower arm portion 175 moves downwardly is controlled by the position at which the limit switches LS10 and 11 are disposed outwardly from the initial position of the arm 185. As shown, the limit switch LS10 is disposed close to the initial position of arm 185 before it starts its forward movement, and, accordingly, the lower arm portion 175 will not move downwardly as far as it does when unloading a workpiece in the press #3. The limit switch LS10 is connected in parallel with the limit switch LS11 by means of the leads 293 and 294 and accordingly, the same circuits are closed and operated to return the lower arm upwardly. The magnets 211 will, however, grip a workpiece in the press #4 and unload it therefrom.

When the arm 185 returns to its rearward position it again actuates the limit switch LS8 and the sequence relay SH is operated and the contacts SR–1 will be closed to complete a circuit through the leads 295, 296, 297 and 298, and relay coil R8–1. The contacts CR8–1 will be closed to complete a circuit through the leads 300 and 301 to energize the solenoid coil 299, whereby the armature bar 302 will be moved to the right as viewed in FIG. 12 and valve spool 275 will be moved to the dotted position marked 275a. The hydraulic fluid would be reversed in its flow to the motor 137 and the arm 155 would be turned clockwise back to the press #3. As the arm 155 moves past the mid-point again the dog 282 on the hub 154 would again close the limit switch LS9 and the unlatch relay UR would operate again to stop the motor 137 if the press #3 is not ready to receive another workpiece. If the press #3 is ready for another workpiece the limit switch LS14 will be tripped by some part 303 on the press #3 and will bypass the contacts CLR–3 by means of the leads 304 and 305. The arm 155 continues back to the press #3 and the cycle will start all over again unless the switch 234 is moved to the "manual" or to the "off" position. If the switch 234 is moved to the "manual" position, the action of limit switch LS8 may be manually controlled by the manual switch 306, and by the manual switch 307. Manual switch 308 may be used to manually lower the arm 175.

FIG. 13 discloses a further embodiment of the invention wherein it is desired to transfer workpieces from a first press 309 to a second press 311 which is disposed to one side of the first press 309 and not opposite thereto as in the first two embodiments. The problem may be solved by employing two transfer mechanisms made in accordance with the invention, as mechanism A and B disposed as shown, and with an intermediate table or the like 310 therebetween. The outer arms 312 of the transfer mechanisms would be shorter in length than the inner arms 313, and, the rotary sprocket wheel 314 would have more than half as many teeth as are on the stationary sprocket wheel 315. That is, the ratio between the number of teeth on wheel 315 as compared to the number of teeth on wheel 314 would be less than 2 to 1, and specifically in the case illustrated, 1½ to 1. The workpieces 317 would be moved along an elliptical path as indicated by the broken line 316. Many other curved travel paths between a straight line path and the path 316 may be obtained by following the principles of the invention.

FIG. 14 discloses a further type of drive means which may be employed in the invention, and which comprises a hydraulic cylinder 318 in which is mounted the usual piston 319 which carries the usual piston rod 320. Fixed on the outer end of the rod 320 is a gear rack 321 which may be used to drive the driven gear 143a which would be mounted on the first rotating shaft, as shaft 145 of the embodiment of FIG. 7.

It will be obvious that the function of the sprockets and chains used in the invention may be also carried out by means of a suitable gear train or by means of a pair of pulleys and a belt. It will also be obvious that a workpiece may be moved along other than straight line paths of action by employing the principles of the invention, since a great flexibility is permitted in selecting a path of action. That is, by maintaining a ratio of 2 to 1 between the stationary and rotating sprockets, the path of action may be changed by changing the length of the auxiliary or second arm to a desired length, to obtain a desired path of action. Furthermore, the ratio between the sprockets may be changed to change the path of action, or, a combination of the last mentioned steps may be employed to obtain a desired path of action.

It will be understood that the stops 63, 111, 222 and 222a aid in providing a reciprocatory action to a transfer mechanism of the invention, whereby, workpieces may be indefinitely and accurately picked-up from a first location and set-down in a second location. The repeating reciprocatory action carried out by such a transfer mechanism provides accurate positioning of a workpiece as compared to a transfer mechanism having a continuous rotary motion and using sprockets and chains, and the like, since in such a continuous rotary motion, every minute variation in the selected ratio, as 2 to 1, between the sprockets would be compounded, thereby making accurate positioning of a workpiece impossible after the transfer operation has been repeated.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a workpiece transfer mechanism, the combination comprising: a support means; a stationary motion transmitting member carried by said support means; a first rotatable shaft extending axially through said stationary motion transmitting member; a reversible power drive means connected to said first rotatable shaft for providing reciprocable rotary motion thereto; a main radial arm having one end thereof fixed to said first rotatable shaft for rotation therewith; a second rotatable shaft carried by said main radial arm on the other end thereof; a rotary motion transmitting member fixed on said second rotatable shaft for rotation therewith; an auxiliary arm carried by said second rotatable shaft and projecting therefrom radially of said rotary motion transmitting member; said auxiliary arm including an upper portion and a lower portion which is movable vertically relative to said upper portion; means for movably supporting said lower portion from said upper portion; gripping means on the outer end of said auxiliary arm lower portion for releasably gripping a workpiece; means for operating said gripping means; means interconnecting said motion transmitting members, whereby, when said main radial arm is rotated by said first rotatable shaft, said motion transmitting members will be responsive to the rotation of the main radial arm and will effect a rotation of said second rotatable shaft and the auxiliary arm; stop means on said support means for providing a pair of end travel positions between which said main radial arm will be reciprocably rotated; and, an electrical control means for automatically controlling the reciprocable rotation of said main radial arm between said end travel positions; said means for operating said gripping means, and said means for movably supporting said lower portion from said upper portion.

2. The structure as defined in claim 1, wherein: said main radial arm is provided with means for automatically de-energizing said electrical control means at a designated point in the rotary travel path of said main radial arm, and, said electrical control means includes circuit means for overcoming the effect of said last mentioned means for automatically de-energizing said electrical control means.

References Cited in the file of this patent

UNITED STATES PATENTS

| | | |
|---|---|---|
| 952,383 | Tomer | Mar. 15, 1910 |
| 1,786,608 | Halstead | Dec. 30, 1930 |
| 1,835,579 | Westin | Dec. 8, 1931 |
| 2,013,905 | Adams | Sept. 10, 1935 |
| 2,381,656 | Ekstergian | Aug. 7, 1945 |
| 2,572,874 | MacKnight | Oct. 30, 1951 |
| 2,649,975 | Brooks | Aug. 25, 1953 |
| 2,653,502 | Meyer | Sept. 29, 1953 |
| 2,802,586 | Wingard | Aug. 13, 1957 |
| 2,811,267 | Bock | Oct. 29, 1957 |

FOREIGN PATENTS

| | | |
|---|---|---|
| 2,467 | Great Britain | Jan. 27, 1801 |